United States Patent
Nuutinen et al.

(10) Patent No.: US 8,571,485 B2
(45) Date of Patent: Oct. 29, 2013

(54) DATA COLLECTION AND SIMULATION

(75) Inventors: Jukka-Pekka Nuutinen, Martinniemi (FI); Marko Pyy, Pattijoki (FI); Marko Tapaninaho, Kempele (FI); Jouni Saastamoinen, Coppell, TX (US)

(73) Assignee: Elektrobit System Test Oy, Oulunsalo (FI)

( * ) Notice: Subject to any disclaimer, the term of this patent is extended or adjusted under 35 U.S.C. 154(b) by 1397 days.

(21) Appl. No.: 12/252,099

(22) Filed: Oct. 15, 2008

(65) Prior Publication Data

US 2010/0093300 A1 Apr. 15, 2010

(51) Int. Cl.
*H04B 17/00* (2006.01)
*H04B 1/00* (2006.01)
*H04B 15/00* (2006.01)

(52) U.S. Cl.
USPC .............. 455/67.14; 455/67.11; 455/63.1

(58) Field of Classification Search
USPC ............. 455/67.14, 67.11, 63.1, 62, 452.2, 455/114.1, 271, 317, 114.2, 115.1, 11, 5.2, 455/226.1
See application file for complete search history.

(56) References Cited

U.S. PATENT DOCUMENTS

| | | |
|---|---|---|
| 2005/0153703 A1 | 7/2005 | Juntti et al. |
| 2005/0267715 A1 | 12/2005 | Kolu et al. |
| 2006/0148509 A1 | 7/2006 | Koo et al. |
| 2007/0127559 A1 | 6/2007 | Chang |
| 2008/0057873 A1 | 3/2008 | Huang et al. |

FOREIGN PATENT DOCUMENTS

| | | |
|---|---|---|
| JP | 2002-185377 | 6/2002 |
| WO | WO2006/075051 A1 | 7/2006 |
| WO | 2007080209 A1 | 7/2007 |

OTHER PUBLICATIONS

Translation of Japanese Official Action for corresponding Japanese Application No. 2011-531525, pp. 1-3 (Oct. 12, 2012).

*Primary Examiner* — Eugene Yun
(74) *Attorney, Agent, or Firm* — Hoffmann & Baron, LLC

(57) ABSTRACT

A receiver receives at least one radio frequency band. A signal processor separates a signal space associated with the at least one signal in the at least one radio frequency band and a background space associated with interference and noise in the at least one radio frequency band. For a simulation, a memory stores the environment data of the at least one radio system based on the background space under control of the signal processor.

25 Claims, 3 Drawing Sheets

DATA COLLECTION AND SIMULATION

BACKGROUND OF THE INVENTION

1. Field of the Invention

The invention relates to data collection and simulation of radio signals.

2. Description of the Related Art

A radio device can be tested against a radio channel either in a real environment or in a simulator simulating the real environment. A typical real measurement takes samples of a desired band about once a second, for example, when moving in an existing radio system. Real measurements are made for several reasons, such as optimizing and debugging the system, testing equipments and applications, verifying quality of service and collecting data on signals. However, tests conducted in a real radio system are undesirable and difficult, because tests taking place outdoors are affected by the weather and season, for example, that change all the time. In addition, a test conducted in one environment (city A) does not fully apply to a corresponding second environment (city B). Additionally, two consecutive tests in one environment are not exactly the same. It is also usually not possible to test a predetermined situation in a real environment. Some interesting phenomena may also take place so seldom in reality that they are hard to test even once not to mention repeatedly.

Then again with a device simulating a radio channel, it is possible to very freely simulate a desired type of radio channel. In a digital radio channel simulator, the channel may be modeled by a FIR (Finite Impulse Response) filter that forms a convolution between an estimated impulse response of a channel and desired radio frequency signal in such a manner that the data delayed by different delays is weighted by channel coefficients, i.e. tap coefficients, and the weighted data components are summed up. The channel coefficients can be altered to reflect the behavior of an actual channel.

Problems are, however, associated with both of the tests. Tests in real environments are too inaccurate, for example, for fast fading and they do not take into account interference and signals outside the designed band. Using a device simulating a radio channel, the impulse response model and the electromagnetic environment are predefined. The selected environment may be a "typical urban" area, for example, and that is the same for Paris and London although the cities are actually different. Additionally, a simulator can generate only artificial noise and interference to the channel, which differ essentially from real noise and interference of a radio system. Hence, there is a need for further development in simulation.

SUMMARY OF THE INVENTION

An object of the invention is to provide improvement. According to an aspect of the invention, there is provided a method of collecting data of at least one radio system for a simulation, the method comprising: receiving at least one radio frequency band; separating a signal space associated with at least one signal in the at least one radio frequency band and a background space associated with interference and noise in the at least one received band; and storing environment data of the at least one radio system based on the background space.

According to another aspect of the invention, there is provided a method of performing a simulation of a radio system, the method comprising performing a simulation with stored environment data based on a background space of a real radio system which is separated from a signal space of the real radio system.

According to another aspect of the invention, there is provided a data collector for a simulation of at least one radio system, the data collector comprising: a receiver, a signal processor and a memory; the receiver is configured to receive at least one radio frequency band; the signal processor is configured to separate a signal space associated with the at least one signal in the at least one radio frequency band and a background space associated with interference and noise in the at least one radio frequency band; and the memory is configured to store the environment data of the at least one radio system based on the background space under control of the signal processor.

According to another aspect of the invention, there is provided a computer readable medium embodying computer program instructions thereon executable by a computer to collect data of at least one radio system for a simulation, and when executed by the computer, to carry out the functions of: receiving at least one radio frequency band; separating a signal space associated with at least one signal in the at least one radio frequency band and a background space associated with interference and noise in the at least one received band; and storing environment data of the at least one radio system based on the background space.

The invention provides several advantages. Realistic radio environment is recorded and based on that real disturbances in the radio system can be simulated.

BRIEF DESCRIPTION OF THE DRAWINGS

In the following, the invention will be described in greater detail with reference to the embodiments and the accompanying drawings, in which.

DETAILED DESCRIPTION OF THE EMBODIMENTS

In a virtual drive test data is collected from a field, processed and the measurement is then repeated as accurately as possible in the laboratory conditions. The measurements are made in a existing radio system or artificial transmitters are used as base stations. The virtual drive test is an off-line solution for the radio system analysis.

Figure 1:
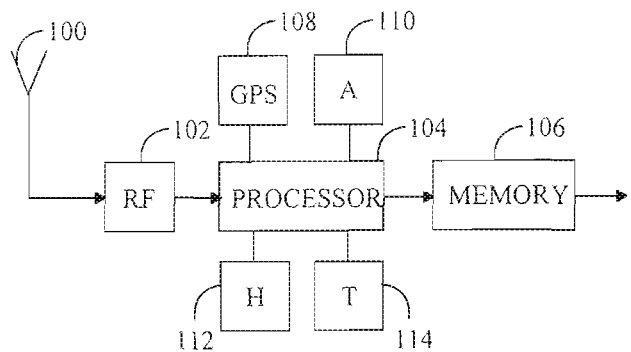
FIG. 1 shows a data collector.

With reference to FIG. 1, examine an example of a data collector which comprises an antenna 100, a mixer 102, a signal processor 104 and a memory 106. The antenna 100 may comprise a single component or it may comprise an array or a matrix of antenna elements. A band of electromagnetic radiation proceeds from the antenna to the mixer 102 where a desired band is mixed down to a base band. Instead of one band, a plurality of desired bands may also be received. After the mixer 102, the base band may be converted into a digital form and processed at least partly in a digital form in a signal processor 104. The signal processor 104 separates a signal space associated with the at least one signal in the at least one band and a background space associated with interference and noise of the received band or bands. The memory 106 stores environment data of the radio system based on the background data under control of the signal processor 104.

The memory 106 may be coupled to a computer or the like by a USB (Universal Serial Bus) port, for example.

The environment data refers to electromagnetic radiation comprising noise and interference, which may include man-made volatile or non-volatile radiation and radiation from natural sources (from celestial bodies or processes or from earthly phenomena such as lightning).

Figure 2:
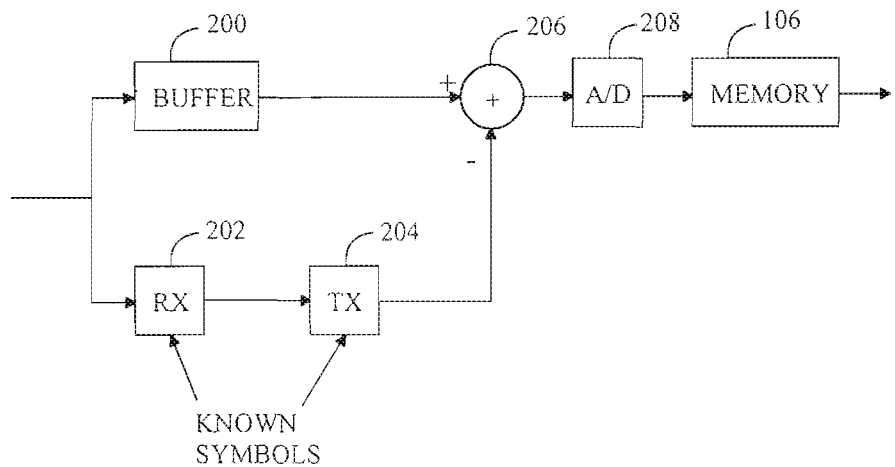
FIG. 2 illustrates a configuration for separating a signal space and a background space.

FIG. 2 presents a possible way to separate the signal space and the background in the signal processor 104. In general, there may be several methods to separate them. Although the following explanation refers to a band the separation may be applied to a plurality of bands. A received band may be divided into two branches. The first branch may have a buffer 200 for delaying the received band suitably with respect to the second branch. In a receiver element 202 of the second branch, several operations may be performed. The band may be mixed down, data in the base band may be converted into a digital form and an impulse response of the channel of a signal in the band may be formed on the basis of a known data in the signal. Since the data in the signal is known as predetermined symbols, their comparison with the detected symbols may be used to determine distortion in a channel and also to estimate an impulse response. The symbols may comprise bits. In a DSSS (Direct Sequence Spread Spectrum) system the impulse response estimate may be obtained from the output of a matched filter and in an OFDM (Orthogonal Frequency Division Modulation) system the impulse response estimate may be obtained as an inverse of the amplitude response.

On the basis of the at least one impulse response estimate and the RF signal carrying known data, a transmitter element 204 may form at least one regenerated signal in a desired RF (Radio Frequency) band. The regeneration of a signal may be based on a suitable signal model of conventional methods such as SAGE (Space Alternating Generalized Expectation Maximization), for example. The transmitter element 204 may first mix up the regenerated base band signal into a desired radio frequency. Then, the effects of a channel may be taken into account by a convolution operation between the at least one impulse response and the corresponding RF signal having known data. A difference between the received signal coming from the buffer 200 and the regenerated signal may then be formed in a differential element 206. The differential element 206 may be a subtractor, where the regenerated signal is subtracted from the received signal synchronously. The difference between the signals may be converted into a digital form in an analog-digital converter 208. The difference lacks the signal but includes the background noise and interference and therefore defines environment data of the radio system. The environment data may be stored in the memory 106.

The environment data may be formed and stored repeatedly in the memory 106 for a proper playback. Environment data formed at different moments may be stored in a chronological order to be retrieved in that order, too. Otherwise, environment data formed at different moments of time may be associated or stamped with a moment of formation or a reception of a signal. The environment data may be formed and stored repeatedly more than 100 times a second. In an embodiment the environment data may be formed and stored repeatedly about 1000 or even thousands of times a second. The environment data can be recorded by the data collector temporally very accurately since the rate of the updates of the environment data is that high. With updates of the environment data at such a high frequency, effects of fading, for example, may be taken into account in the data and simulation. In an embodiment, the period between two successive updates of the environment data may be shorter than a delay spread of a signal in a received band.

The received band may be broader than the designed bandwidth of signals in the radio system. In a similar manner, the environment data may be formed and stored with a bandwidth broader than the designed bandwidth of signals in the radio system. This allows potential interference scenarios to be noticed. For example, if the bandwidth of the received signal is 10 kHz, the bandwidth of reception and environment may be 20 kHz, for instance. The bandwidth for reception and the environment data may be broader than about 10 MHz. In a UMTS radio system (Universal Mobile Telecommunications System), the bandwidth of the reception and environment may be 50 MHz or 100 MHz, for example.

If the data collector needs to be operator specific it is possible to include a SIM (Subscriber Identity Module) card and SIM card authentication. A wider bandwidth than that required by the operator may be recorded.

FIG. 1 includes also some potential embodiments for receiving more information on the environment. A locator 108 such as a receiver of a satellite positioning system may be coupled to the signal processor 104. The locator 108 follows the data collector as it moves in the radio system. The locator 108 determines its location in the radio system based on signals from satellites at a plurality of moments during a reception of the desired band by the data collector. The satellite positioning system may be, for instance, a GPS (Global Positioning System). The signal processor 104 may associate the environment data at each moment with the simultaneously determined location and control the storing of the environment data with the associated location data. The associated data may be two dimensional if the height information is not available. However, the height data may be obtained from a map making the associated data three dimensional.

The virtual test drive may be a 3D (3 Dimensional) drive where base stations may be placed virtually. It is possible to drive a virtual route in simulated surroundings to test how the virtual radio system works. It is also possible to drive through several cells and monitor a MAC (Medium Access Control) layer and RRM (Radio Resource Management) functionalities. Hence, it is possible to simulate a handover.

A sensor 110 of acceleration may be coupled to the signal processor 104. The sensor 110 transforms the forces it experiences into electric signals, which may be converted into a digital form in or before the signal processor 104. The signal processor 104 may determine the speed of the data collector at each moment by integrating the acceleration and control the storing of the environment data with the associated speed data. Knowing the speed of the data collector makes it possible to determine a coherence time. In an embodiment sampling is performed at least twice in the coherence time. A satellite positioning system such as GPS may be used. Although the sampling rate may be different, any moment may be interpolated linearly.

A sensor 112 of height may be coupled to the signal processor 104. The operation of the sensor 112 may be based on a sensitivity to the atmospheric pressure. The sensor 112 transforms the atmospheric pressure into an electric signal which may be converted into a digital form in or before the signal processor 104. The signal processor 104 may associate the environment data with the simultaneously determined height at each moment and control the storing of the environment data with the associated height data. If the position on the globe is available, the signal processor 104 may associate the environment data with the simultaneously determined three dimensional location at each moment and control the storing of the environment data with the associated three dimensional location data. In general the location does not need to be three dimensional, but two or even one dimensional location may also do. The network does not necessarily work at a certain geographical area and the area may be associated with the radio channel.

Additionally, a sensor 114 of temperature may be coupled to the signal processor 104. The sensor 114 transforms the temperature into an electric signal, which may be converted into a digital form in or before the signal processor 104. The signal processor 104 may associate the environment data with the simultaneously determined height data at each moment and more generally control the storing of the environment data with the associated temperature data. This association enables an embodiment to take into account different weathers and seasons.

Figure 3:
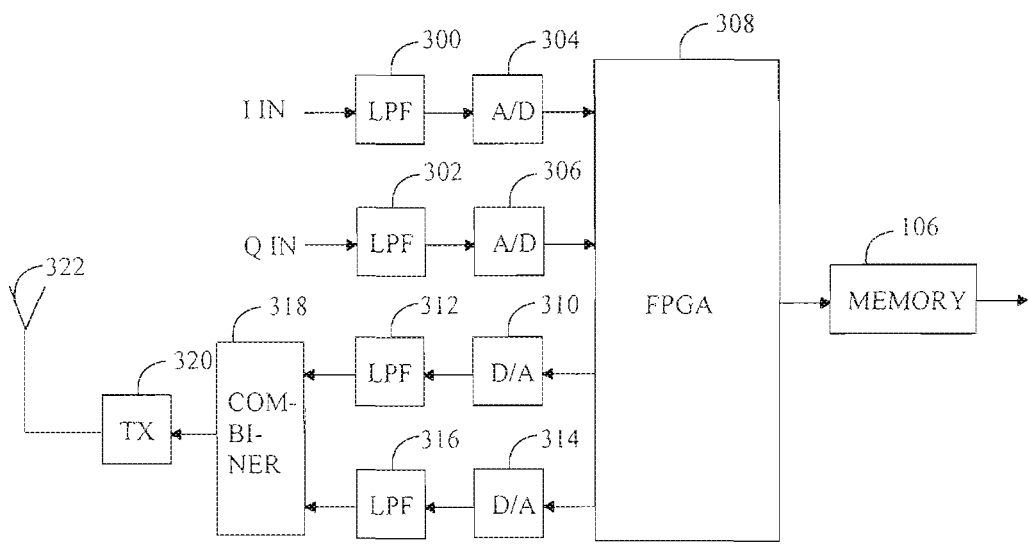
FIG. 3 illustrates a vector card.

FIG. 3 presents a vector card, which may be used as signal processor 104. The received signal may have been modulated using I/Q-modulation (In-phase/Quadrature) and the signal of that form may be received in filters 300, 302. The analog signals may then be converted into a digital form in converters 304, 306. The digital signal may then proceed in an FPGA engine 308 (Field Programmable Gate Array). In general, there may be one or more FPGAs in an FPGA engine. The FPGA engine 308 may be repeatably configurable and fast at processing. In the UMTS, the FPGA engine 308 may decode common pilot signals, for example, in order to form an estimate of an impulse response of a channel. Additionally, the FPGA engine 308 may separate the signal space and the background before storing the background in the memory 106. However during collection of data, the received band may be stored in the memory 106 along with the estimate of the impulse response. The received band may be recorded by storing I and Q samples (with noise and interference), for example. Later, when all the necessary data has been collected, the signal space and the background can be separated from each other using the stored estimates of the impulse responses and the background may be stored in the memory 106.

Several streams of data may be received if a plurality of vector cards are coupled in parallel. One vector card may receive and process a band from a 3G radio system (Third Generation), and another vector card may receive and process a band from a 2G radio system (Second Generation). Correspondingly, several vector cards may receive and process a plurality of bands, each band including one channel of MIMO channels (Multiple In Multiple Out). The signal processor 104 which acts as a computational engine may be reconfigurable to support various standards.

The data collector of FIG. 3 may also be used as a part of a transmitter. If the radio network does not exist or is not yet operating, it is possible to place a device with the vector card and memory in base station sites. To be a transmitter, D/A converters 310, 314 may be used for I/Q modulated signals from the FPGA engine 308. The I/Q modulated signals may be filtered in filters 312, 316. Additionally, a combiner 318 for combining the I/Q modulated symbols into a base band signal, a mixer 320 for mixing up the base band signal and an antenna 322 may be needed for a transmitter. The transmitted symbols may be stored in the memory 106 and the FPGA engine 308 may be configured to modulate them in the I/Q form. As the FPGA engine 308 is programmable it may be reprogrammed each time its purpose of operation changes from a receiver to a transmitter, for example, or vice versa.

Figure 4:
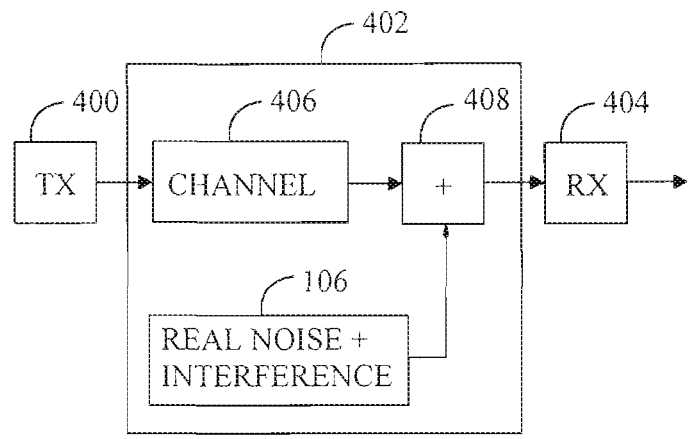
FIG. 4 illustrates a simulator.

FIG. 4 illustrates a simulator. A transmitter 400 transmits a signal through a simulator 402 to a receiver 404. The simulator 402 may include a channel element 406, which performs a convolution between an estimate of an impulse response of a channel and the RF signal. The simulator 402 also includes a memory 106, which contains the environment data. Additionally, the simulator comprises an adder 408, which adds the environment data to the RF signal after the channel element 406. The signal received at a receiver 404 includes synthetic deviations caused by the channel element 406 and noise and interferences recorded in a real radio system.

When recording the environment data, the data collector may travel at a certain speed or at certain speeds in the radio system. However, during a simulation which may be a virtual test drive, the environment data may be played back at a different speed or speeds, which correspond to a movement of a receiver in the simulation. Additionally, the amplitude of the environment data may be changed from that of the recorded level.

Figure 5:
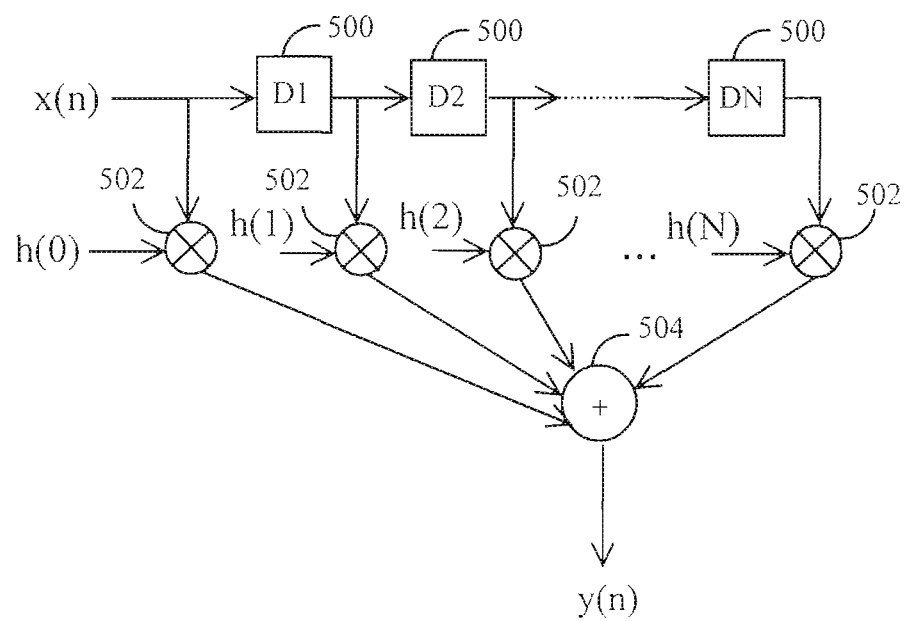
FIG. 5 illustrates an FIR filter.

FIG. 5 presents a channel element 406 which may be a FIR filter. The FIR filter comprises delay elements 500 arranged as a shift register, weight coefficient blocks 502 and a summer 504. An input signal x(n) is delayed in each delay element 500, whose delays may have the same or different length in time, and the delayed signals are weighted in the weight coefficient blocks 502 by the desired weight coefficient h(i), where i=[0, . . . , N]. The weight coefficients h=[h(0), . . . , h(N)] are channel estimates of the radio channel, also called tap coefficients of the FIR filter. The weight coefficients are changed in the same way as the characteristics of a real radio channel are thought to change. Usually weight coefficients are quite stable in the short run, but change slowly compared with the variation rate of the signal. The delayed and weighted signals are summed in a summer 504.

Generally, weight coefficients may be real or complex. Complex weight coefficients are needed since for instance a radio channel of the GSM (Global System for Mobile communication) or CDMA radio system (Code Division Multiple Access) uses quadrature modulation, wherein a signal is divided into two parts. The real signal part I (Inphase) is multiplied by a carrier without phase shift and the imaginary signal part Q (Quadrature) is multiplied by a phase shifted carrier. Thus signal x can be expressed in the form x=I+jQ, where I is the real signal part, Q is the imaginary signal part and j is an imaginary unit.

In a mathematical form, the output signal y(n) of the FIR filter may be expressed as a convolution comprising a sum of the product of the delayed signal and the weight coefficients:

$$y(n) = x * h = \sum_{k=1}^{N} h(k) \times (n-k)$$

where * denotes a convolution operation and n denotes the index of a signal element. Signals x and y and channel impulse response h may be processed as a scalar, in vector form or in matrix form in a manner known per se.

Figure 6:
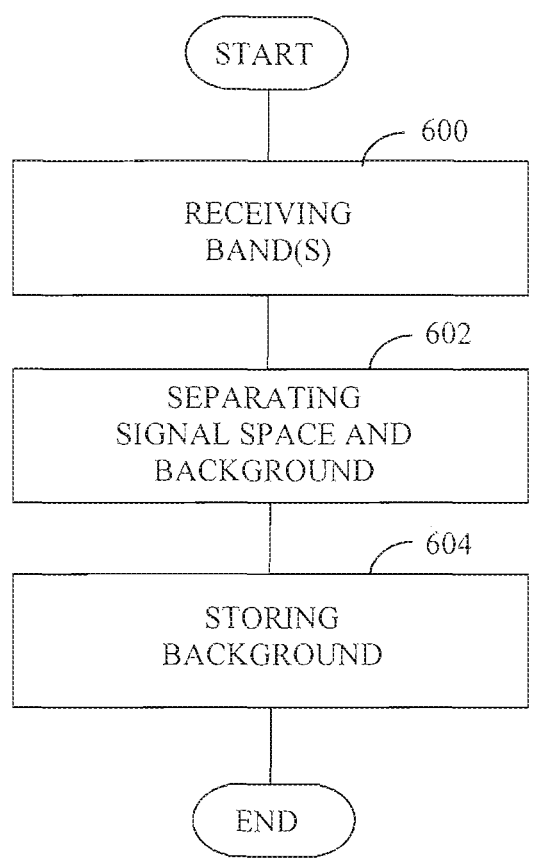
FIG. 6 presents a flow chart of the method of data collection.

FIG. 6 presents a flowchart of the method. In step 600, at least one radio frequency band is received. In step 602, a signal space associated with at least one signal in the at least one radio frequency band and a background space associated with interference and noise in the at least one received band are separated. In step 604, environment data of the at least one radio system based on the background space in stored.

The embodiments may be implemented, for instance, with ASIC or VLSI circuits (Application Specific Integrated Circuit, Very Large Scale Integration). Alternatively or additionally, the embodiments may be implemented as computer programs comprising instructions for executing a computer process of collecting data of at least one radio system for a simulation.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method of collecting data of at least one radio system for a simulation, the method comprising:
    receiving at least one radio frequency band;
    separating a signal space associated with at least one signal in the at least one radio frequency band and a background space associated with interference and noise in the at least one received band, the separating comprising:
    forming at least one impulse response estimate on the basis of the at least one signal having known data;
    forming at least one regenerated signal on the basis of the at least one impulse response estimate and the known data; and
    forming environment data as a difference between a received signal and a regenerated signal of the at least one regenerated signal.

2. The method of claim 1, the method further comprising storing environment data repeatedly more than 100 times a second.

3. The method of claim 1, the method further comprising storing environment data repeatedly about 1000 times a second.

4. The method of claim 1, the method further comprising storing the environment data with a bandwidth broader than the designed bandwidth of signals of the at least one radio system.

5. The method of claim 1, the method further comprising storing the environment data with a bandwidth broader than about 10 MHz.

6. The method of claim 1, the method further comprising determining timing of a reception of the at least one radio frequency band; and associating the environment data with the determined timing.

7. The method of claim 1, the method further comprising determining a location of a reception of the at least one radio frequency band in the at least one radio system; and associating the environment data with the determined location.

8. The method of claim 1, the method further comprising determining acceleration of the reception of the at least one radio frequency band; and associating the environment data with the determined acceleration.

9. The method of claim 1, the method further comprising determining temperature during the reception of the at least one radio frequency band; and associating the environment data with the determined temperature.

10. The method of claim 1, the method further comprising receiving at least two radio frequency bands which include signals of different multiple-in-multiple-out channels.

11. The method of claim 1, the method further comprising receiving at least two radio frequency bands which include signals of different radio systems.

12. A method of performing a simulation of a radio system, the method comprising:
    performing a simulation with stored environment data associated with the radio system based on a background space of a real radio system which is separated from a signal space of the real radio system, the environment data generated by:
    receiving at least one radio frequency band;
    separating a signal space associated with at least one signal in the at least one radio frequency band and a background space associated with interference and noise in the at least one received band, the separating comprising:
    forming at least one impulse response estimate on the basis of the at least one signal having known data;
    forming at least one regenerated signal on the basis of the at least one impulse response estimate and the known data; and
    forming environment data as a difference between a received signal and a regenerated signal of the at least one regenerated signal.

13. A data collector for a simulation of at least one radio system,
    the data collector comprising:
    a receiver;
    a signal processor;
    and a memory, the receiver being configured to receive at least one radio frequency band, the signal processor is being configured to separate a signal space associated with the at least one signal in the at least one radio frequency band and a background space associated with interference and noise in the at least one radio frequency band by:
    forming at least one impulse response estimate on the basis of the at least one signal with known data,
    forming at least one regenerated signal on the basis of the at least one impulse response estimate and the known data, and
    forming environment data as a difference between a received signal and a regenerated signal.

14. The data collector of claim 13, wherein the data collector is configured to provide and store the environment data repeatedly more than 100 times a second.

15. The data collector of claim 13, wherein the data collector is configured to provide and store the environment data repeatedly about 1000 times a second.

16. The data collector of claim 13, wherein the data collector is configured to receive the at least one signal and to store the environment data with a bandwidth broader than the designed bandwidth of signals of the at least one radio system.

17. The data collector of claim 13, wherein the data collector is configured to receive the at least one signal, and to store the environment data with a bandwidth broader than about 10 MHz.

18. The data collector of claim 13, wherein the data collector comprises a locator configured to determine a location of a reception of the at least one signal in the at least one radio system; and the signal processor is configured to associate the environment data with the determined location.

19. The data collector of claim 13, wherein the data collector comprises a clock configured to determine timing of a reception of the at least one radio frequency band; and the signal processor is configured to associate the environment data with the determined timing.

20. The data collector of claim 13, wherein the data collector comprises a sensor configured to determine acceleration of the reception of the at least one radio frequency band; and the signal processor is configured to associate the environment data with the determined acceleration.

21. The data collector of claim 13, wherein the data collector comprises a thermometer configured to determine temperature during the reception of the at least one radio frequency band; and the signal processor is configured to associate the environment data with the determined temperature.

22. The data collector of claim 13, wherein the data collector is configured to receive at least two radio frequency bands which include signals of different multiple-in-multiple-out channels.

23. The data collector of claim 13, wherein the data collector is configured to receive at least two radio frequency bands which include signals of different radio systems.

24. A non-transitory computer readable device embodying computer program instructions thereon that, when executed by a computer, cause the computer to collect data of at least one radio system for a simulation by performing operations comprising:

receiving at least one radio frequency band;

separating a signal space associated with at least one signal in the at least one radio frequency band and a background space associated with interference and noise in the at least one received band by:

forming at least one impulse response estimate on the basis of the at least one signal with known data, forming at least one regenerated signal on the basis of the at least one impulse response estimate and the known data, and forming environment data as a difference between a received signal and a regenerated signal.

25. The computer readable device of claim 24, wherein the computer readable device comprises at least one of the following media: a program storage medium, a record medium, a computer readable memory, a computer readable software distribution package, and a computer readable compressed software package.

* * * * *

UNITED STATES PATENT AND TRADEMARK OFFICE
CERTIFICATE OF CORRECTION

PATENT NO. : 8,571,485 B2  
APPLICATION NO. : 12/252099  
DATED : October 29, 2013  
INVENTOR(S) : Nuutinen et al.

Page 1 of 1

It is certified that error appears in the above-identified patent and that said Letters Patent is hereby corrected as shown below:

IN THE SPECIFICATION:

Column 6, line 63:

Now reads:   "background space in stored.";

Should read:   -- background space is stored. --.

Column 8, lines 37 and 38:

Now reads:   "the signal processor is being configured";

Should read:   -- the signal processor being configured --.

Signed and Sealed this  
Third Day of June, 2014

Michelle K. Lee  
*Deputy Director of the United States Patent and Trademark Office*